US011487272B2

(12) United States Patent
Ding et al.

(10) Patent No.: US 11,487,272 B2
(45) Date of Patent: Nov. 1, 2022

(54) MULTI-SCALE DATA ACQUIRING AND PROCESSING DEVICE AND METHOD FOR ALUMINUM OXIDE PRODUCTION PROCESS

(71) Applicant: Northeastern University, Shenyang (CN)

(72) Inventors: Jinliang Ding, Shenyang (CN); Changxin Liu, Shenyang (CN); Ning Yuan, Shenyang (CN); Tianyou Chai, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 291 days.

(21) Appl. No.: 16/956,286

(22) PCT Filed: Jul. 18, 2019

(86) PCT No.: PCT/CN2019/096479
§ 371 (c)(1),
(2) Date: Jun. 19, 2020

(87) PCT Pub. No.: WO2021/007832
PCT Pub. Date: Jan. 21, 2021

(65) Prior Publication Data
US 2021/0096544 A1 Apr. 1, 2021

(30) Foreign Application Priority Data
Jul. 16, 2019 (CN) .......................... 201910640297.0

(51) Int. Cl.
*G05B 19/418* (2006.01)
*C25D 5/44* (2006.01)
*G06N 5/02* (2006.01)

(52) U.S. Cl.
CPC ......... *G05B 19/41825* (2013.01); *C25D 5/44* (2013.01); *G05B 19/4183* (2013.01); *G05B 19/4185* (2013.01); *G06N 5/025* (2013.01)

(58) Field of Classification Search
CPC ............ G05B 19/4183; G05B 19/4185; G05B 19/41825; G06N 5/025; C25D 5/44
(Continued)

(56) References Cited

U.S. PATENT DOCUMENTS

2020/0249667 A1* 8/2020 Sabot .................. H04L 41/0613

FOREIGN PATENT DOCUMENTS

| CN | 1904786 A | 1/2007 |
|---|---|---|
| CN | 102520685 A | 6/2012 |

(Continued)

*Primary Examiner* — Hien D Khuu
(74) *Attorney, Agent, or Firm* — Muncy, Geissler, Olds & Lowe, P.C.

(57) ABSTRACT

A multi-scale data acquiring and processing device and method for an aluminum oxide production process. The device includes a production index and variable configuring module, a data acquiring module, a data storing module, a main control module, a display module, a data processing module and a data transmitting module. The main control module is used for emitting a command, acquiring production indexes and variables generated in the aluminum oxide production process by different process control devices, and is used for performing unified processing, storage and display on the data, and further the data is transmitted through a transmitting module to systems or devices using the data.

8 Claims, 3 Drawing Sheets

(58) Field of Classification Search
USPC .......................................................... 700/179
See application file for complete search history.

(56) References Cited

FOREIGN PATENT DOCUMENTS

| | | | |
|---|---|---|---|
| CN | 104076686 A | | 10/2014 |
| CN | 105739395 | * | 7/2016 |
| CN | 106407278 A | * | 2/2017 |
| CN | 108710625 | * | 10/2018 |
| CN | 108762210 A | | 11/2018 |
| CN | 106407278 B | * | 3/2020 |

* cited by examiner

MULTI-SCALE DATA ACQUIRING AND PROCESSING DEVICE AND METHOD FOR ALUMINUM OXIDE PRODUCTION PROCESS

BACKGROUND OF THE INVENTION

1. Field of the Invention

The invention relates to the technical field of multi-scale data acquiring and processing, in particular to a multi-scale data acquiring and processing device and method for an aluminum oxide production process.

2. The Prior Arts

In a broad sense, a scale is a unit or a measuring tool of a research object. Aiming at data mining using data as a research object, the scale is also a measuring unit of data. Similar to statistics in which a measuring scale is used for measuring data by using variables as a standard, the scale measuring standard in the data mining should be inherent attributes of the data, when a researcher inspects the data in a certain category, the scale measuring standard often corresponds to an attribute set of the data in the category, the attribute set can usually form a concept hierarchy being clear in partial order structure, and data sets having multi-scale characteristics can be formed through dividing the data according to related concepts in the concept hierarchy.

A multi-scale data acquiring and processing device in the aluminum oxide production process is used for performing multi-scale data acquiring and data preprocessing on the aluminum oxide production process so as to upload the data to be used for guiding aluminum oxide machining and production. In a present aluminum oxide production process, data acquiring mainly depends on a sensor or a control device, different sensors or control devices are different in data sampling frequencies of collected data and different in data acquiring sources, namely different in data scales, so that the difficulty of staff for processing the data at the later stage is increased, and the efficiency of an enterprise is influenced.

SUMMARY OF THE INVENTION

The invention aims to solve the technical problem of providing a multi-scale data acquiring and processing device and method for an aluminum oxide production process aiming at deficiencies existing in the prior art so as to realize acquiring of multi-scale data in the aluminum oxide production process and solve the difficult problem of aluminum oxide data information occlusion.

In order to solve the technical problem, the technical scheme adopted by the invention lies in that on one hand, the multi-scale data acquiring and processing device for the aluminum oxide production process provided by the invention comprises a production index and variable configuring module, a data acquiring module, a data storing module, a main control module, a display module, a data processing module and a data transmitting module, Wherein the production index and variable configuring module is used for performing operations of addition, modification, sampling frequency selection and deletion on aluminum oxide production indexes and variables, which need to be acquired, to realize configuration of aluminum oxide production indexes and variables, which need to be acquired;

The data acquiring module is used for acquiring data having different time scales in the aluminum oxide production process at the same time based on the aluminum oxide production indexes and variables configured by the production index and variable configuring module in a manner of cooperatively using a wired data acquiring port, a wireless data acquiring port and an image collector based on a camera; for control equipment which can export the data in the aluminum oxide production process, data acquiring is performed through cooperatively using a wired data acquiring manner and a wireless data acquiring manner, but for control equipment which cannot export the data in the aluminum oxide production process, image acquiring is performed through an image acquiring machine so as to export the data;

The main control module is connected with the data acquiring module, the data processing module, the data storing module, the display module and the data transmitting module, and is used for performing central regulation and control, and emitting a central control command to complete coordination and cooperation between the data acquiring module, the data processing module, the data storing module, the display module and the data transmitting module;

The data processing module is used for performing timestamp alignment and abnormal value filtering treatment on multi-scale data in the aluminum oxide production process acquired by the data acquiring module through receiving a data processing command from the main control module, has a whole set of complete rule bases based on the aluminum oxide production process to perform data processing on aluminum oxide production indexes and variables having different scales, and is used for transmitting processed data to the data storing module for data storage;

The data storing module is used for storing data from the data acquiring module and the data processing module according to a data storing command of the main control module, at the same time, receiving a control command transmitted by the main control module every fixed time and transmitting stored data to the data transmitting module;

The data transmitting module is used for transmitting the stored data stored by the data storing module to a system or a device needed to use operating indexes and variables of the aluminum oxide production process according to a transmitting command of the main control module; and The display module is connected with the main control module through a touch screen for cooperative work.

Preferably, the aluminum oxide production indexes and variables comprise grinding AO, A/S, ore adjustment Nk, ore adjustment solid content, lime effective calcium, raw ore pulp solid content, raw ore pulp fineness, leaching red mud A/S, leaching red mud N/S, excretion A/S, leaching ak, leaching solid content, leaching rate, green liquor Nk, green liquor ak, green liquor seston, pregnant liquor seston, circulating spent liquor Nc/Nt, Nk, circulating efficiency, spent liquor seston, seed precipitation end tank ak, precipitation rate, flat plate filter cakes with water and soda, flat spent seston, precipitation spent liquor ak, and water content of red mud filter cakes.

Preferably, a detecting module with an indicator lamp is also built-in the data acquiring module, and when the data acquiring module performs data acquiring, the indicator lamp of the detecting module continuously lights.

Preferably, the data processing module further comprises a data format converting sub-module which is used for converting treated data to data in a binary form to be transmitted to the data storing module for data storage.

Preferably, the data storing module further comprises a format converting sub-module which is used for converting received data to data in the formats of .xls, .txt, .doc, .pdf or .csv for storage.

Preferably, the main control module and the data processing module both adopt a CPU, and the data storing module adopts a random access memory.

Preferably, the display module specifically comprises the following functions of:

(1) Displaying the functions of addition, modification, sampling frequency selection and deletion of the aluminum oxide production operating indexes and variables;

(2) Examining the working states of the data acquiring module, the data processing module, the data storing module and the data transmitting module; and (3) Displaying data of all the aluminum oxide production indexes and variables in the data storing module.

On the other hand, the invention further provides a multi-scale data acquiring and processing method for an aluminum oxide production process, and the method comprises the following steps:

Step 1, the data acquiring module is connected with a sensor which is used for detecting the aluminum oxide production indexes and variables in real time in an aluminum oxide process control system and a wireless collector which is used for acquiring data in a process operating system and a laboratory assaying and analyzing system through a wired data acquiring port and a wireless data acquiring port;

Step 2, aluminum oxide production indexes and variables, which need to be acquired, are selected through the production index and variable configuring module, and different sampling frequencies are set for different indexes and variables;

Step 3, the main control module transmits a data acquiring command to the data acquiring module, the data acquiring module continuously responds the data acquiring command and completes data acquiring, and besides, the display module displays the data acquiring state;

Step 4, the data acquiring module completes data acquiring, a data acquiring completing signal is transmitted to the main control module, after the main control module receives the signal, a data processing command is emitted to the data processing module, the data processing module performs data scale discrimination after receiving the command, data processing is performed based on different data applying rules having different scales, multi-scale data performs algorithm selection on aluminum oxide production process operating indexes and variables having different scales according to a conventional knowledge rule base, so that timestamp alignment and abnormal value filter treatment of the multi-scale data are performed, and besides, the display module displays the data processing state;

Step 5, the data processing module feeds back the processing result to the main control module, the main control module emits a storing command to the data storing module after receiving the feedback, the data storing module receives the data from the data processing module and performs data storage, and besides, the display module displays the data storing state; and Step 6, after the data storage is completed, storage completing information is fed back to the main control module, after receiving a signal, the main control module emits a data unloading signal to the data storing module and the data transmitting module every fixed time, the data in the data storing module is uploaded to a cloud server and other equipment needing aluminum oxide production indexes and variable data, in the uploading process, the data transmitting module performs package uploading on the data in the data storing module through 4G or wifi, and besides, the display module displays the data uploading state and the data uploading information.

The multi-scale data acquiring and processing device and method adopting the technical scheme have the beneficial effects that according to the multi-scale data acquiring and processing device and method for an aluminum oxide production process provided by the invention, data dispersed in the aluminum oxide production process can be subjected to unified management, problems of data redundancy and the like are avoided, operations of data cleaning and the like are omitted, besides, the device is simple in configuration, multiple devices have a unified data acquiring, processing and storing rule, a user can conveniently perform precise model training and working procedure index predicting functions, and the production efficiency of enterprises is improved.

DETAILED DESCRIPTION OF THE PREFERRED EMBODIMENT

The detailed description of the invention is further elaborated in combination with the drawings and the embodiment. The following embodiment is used to illustrate the invention, but is not intended to limit the scope of the invention.

Figure 1:
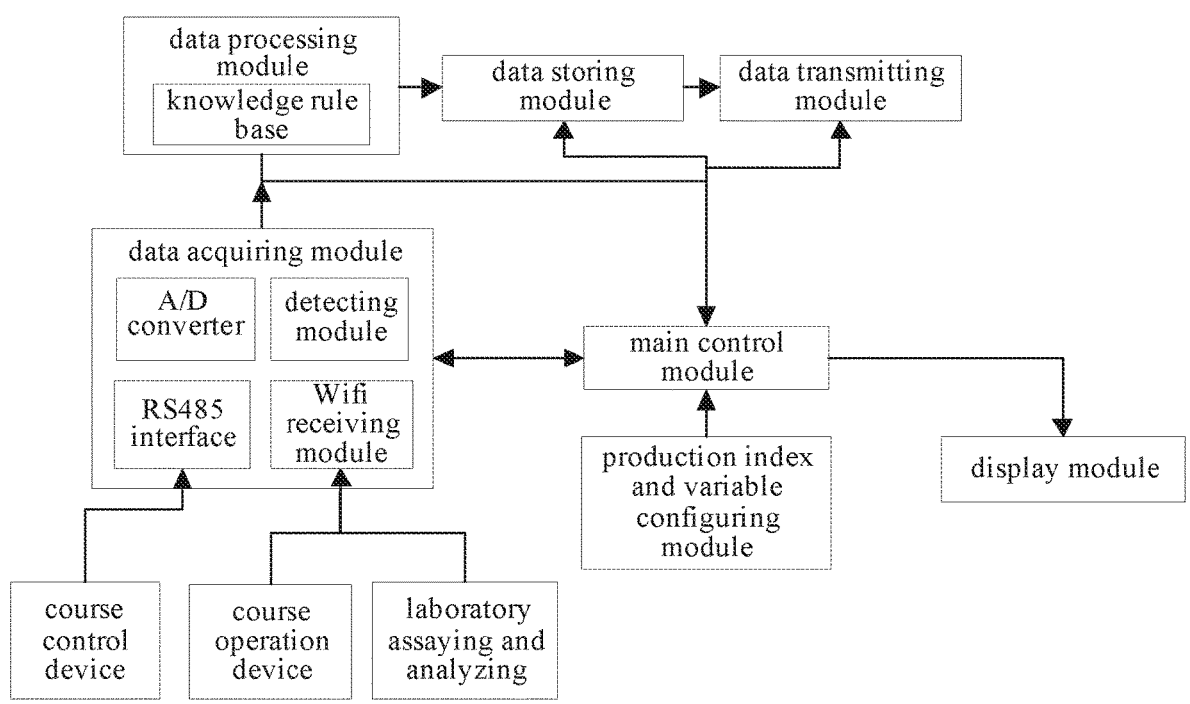
FIG. 1 is a structure diagram of a multi-scale data acquiring and processing device for an aluminum oxide production process provided by the embodiment of the invention.

In the embodiment, a multi-scale data acquiring and processing device for an aluminum oxide production process, as shown in the FIG. 1, comprises a production index and variable configuring module, a data acquiring module, a data storing module, a main control module, a display module, a data processing module and a data transmitting module, Wherein the production index and variable configuring module is used for performing operations of addition, modification, sampling frequency selection and deletion on aluminum oxide production indexes and variables, which need to be acquired, to realize configuration of aluminum oxide production indexes and variables, which need to be acquired;

In the embodiment, the aluminum oxide production indexes and variables comprise grinding AO, A/S, ore adjustment Nk, ore adjustment solid content, lime effective calcium, raw ore pulp solid content, raw ore pulp fineness, leaching red mud A/S, leaching red mud N/S, excretion A/S, leaching ak, leaching solid content, leaching rate, green liquor Nk, green liquor ak, green liquor seston, pregnant liquor seston, circulating spent liquor Nc/Nt, Nk, circulating efficiency, spent liquor seston, end tank ak, precipitation rate, flat plate filter cakes with water and soda, flat spent seston, precipitation spent liquor ak, and water content of red mud filter cakes.

The data acquiring module is used for acquiring data having different time scales in the aluminum oxide production process at the same time based on the aluminum oxide production indexes and variables configured by the production index and variable configuring module in a manner of cooperatively using a wired data acquiring port, a wireless data acquiring port and an image collector based on a camera; for control equipment which can export the data in the aluminum oxide production process, data acquiring is performed through cooperatively using a wired data acquiring manner and a wireless data acquiring manner, but for control equipment which cannot export the data in the aluminum oxide production process, image acquiring is performed through an image acquiring machine so as to export the data; preferably, a detecting module with an indicator lamp is also built-in the data acquiring module, and when the data acquiring module performs data acquiring, the indicator lamp of the detecting module continuously lights.

In the embodiment, large-scale process control devices of PLC, DCS and the like used in the aluminum oxide production process adopt the wired data acquiring port and adopt an RS485 interface for data signal communications, a communication protocol adopts an MODBUS RTU protocol, and unified butt joint with industrial field data is realized; in the embodiment, the device disclosed by the invention can receive 8 channels of simulation quantities at most, if more channels of stimulation quantities need to be collected, the data acquiring module can be subjected to combined acquiring, an analog-digital converting module is embedded in the data acquiring module, and the simulation quantities are converted into digital quantities; data obtained through a process operating device and laboratory assaying and analyzing used in the aluminum oxide production process can be subjected to data storage through a database, then the data is exported through a wireless data acquiring port (such as WiFi), and after the data collection is completed in two manners, the collected data is transmitted to the data processing module through a main controller command.

The main control module is connected with the data acquiring module, the data processing module, the data storing module, the display module and the data transmitting module, and is used for performing central regulation and control through a CPU, and emitting a central control command to complete coordination and cooperation between the data acquiring module, the data processing module, the data storing module, the display module and the data transmitting module.

Figure 2:
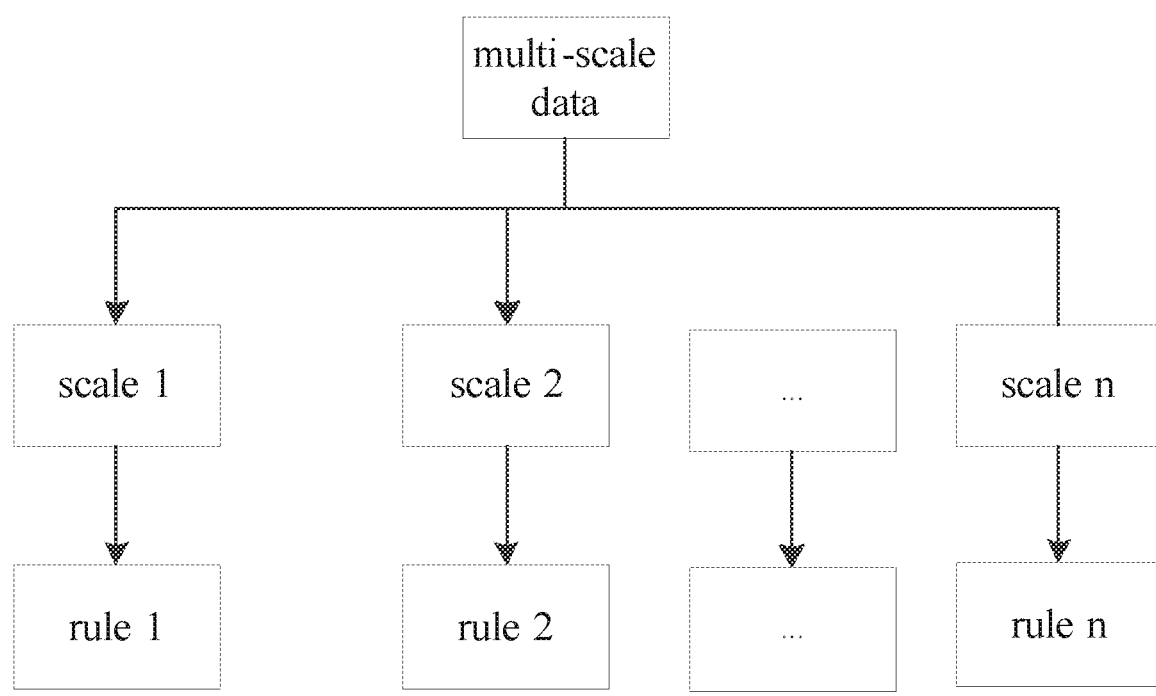
FIG. 2 is a schematic diagram of a knowledge rule base of a data processing module of the multi-scale data acquiring and processing device for an aluminum oxide production process provided by the embodiment of the invention.

The data processing module is used for performing timestamp alignment and abnormal value filtering treatment on multi-scale data in the aluminum oxide production process acquired by the data acquiring module through receiving a data processing command from the main control module by adopting another CPU, has a whole set of complete rule bases based on the aluminum oxide production process as shown in the FIG. 2 to perform data processing on aluminum oxide production indexes and variables having different scales, and is used for transmitting processed data to the data storing module for data storage; and the data processing module further comprises a data format converting sub-module which is used for converting the processed data to data in a binary form to be transmitted to the data storing module for data storage. The data processing module further comprises a data format converting sub-module which is used for converting processed data to data in a binary form to be transmitted to the data storing module for data storage.

The data storing module adopts RAM (namely, random access memory), the RAM is a memory directly exchanging data with the CPU, can realize read and write at any time, is high in speed, is used for storing the data from the data acquiring module and the data processing module according to a data storing command of the main control module, and at the same time, is used for receiving a control command transmitted by the main control module every fixed time and transmitting the stored data to the data transmitting module; and the data storing module further comprises a format converting sub-module which is used for converting received data to data in the formats of .xls, .txt, .doc, .pdf or .csv for storage.

The data transmitting module is used for transmitting the stored data stored by the data storing module to a system or a device needing to use operating indexes and variables of the aluminum oxide production process according to a transmitting command of the main control module.

The display module adopts a touch screen, is connected with the main control module through for cooperative work, and specifically comprises the following functions of:

(1) Displaying the functions of addition, modification, sampling frequency selection and deletion of the aluminum oxide production indexes and variables;

(2) Examining the working states of the data acquiring module, the data processing module, the data storing module and the data transmitting module; and (3) Displaying data of all the production indexes and variables in the data storing module.

Figure 3:
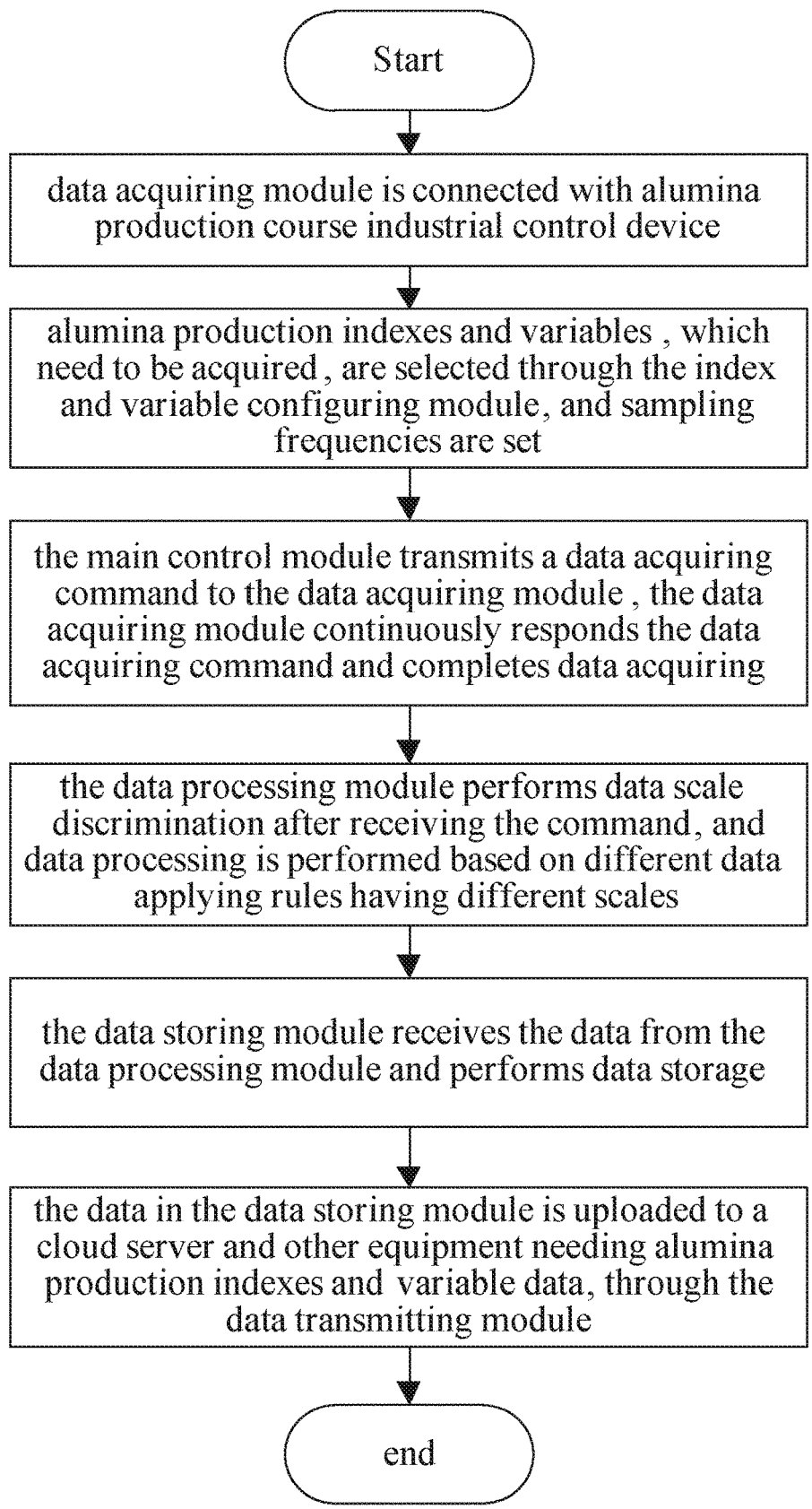
FIG. 3 is a flow diagram of a multi-scale data acquiring and processing method for an aluminum oxide production process provided by the embodiment of the invention.

A multi-scale data acquiring and processing method for an aluminum oxide production process, as shown in the FIG. 3, comprising the following steps:

Step 1, the data acquiring module is connected with a sensor which is used for detecting production indexes and variables in real time in an aluminum oxide process control system and a wireless collector which is used for acquiring data in a process operating system and a laboratory assaying and analyzing system through a wired data acquiring port and a wireless data acquiring port;

Step 2, aluminum oxide production indexes and variables, which need to be acquired, are selected through the production index and variable configuring module, and different sampling frequencies are set for different indexes and variables;

Step 3, the main control module transmits a data acquiring command to the data acquiring module, the data acquiring module continuously responds the data acquiring command and completes data acquiring, and besides, the display module displays the data acquiring state;

Step 4, the data acquiring module completes data acquiring, a data acquiring completing signal is transmitted to the main control module, after the main control module receives the signal, a data processing command is emitted to the data processing module, the data processing module performs data scale discrimination after receiving the command, data processing is performed based on different data applying rules having different scales, multi-scale data performs algorithm selection on aluminum oxide production indexes and variables having different scales according to a conventional knowledge rule base, so that timestamp alignment and abnormal value filter treatment of the multi-scale data are performed, data transmitting and use by users in the later stage, are facilitated, and besides, the display module displays the data processing state;

Step 5, the data processing module feeds back the processing result to the main control module, the main control module emits a storing command to the data storing module after receiving the feedback, the data storing module receives the data from the data processing module and performs data storage, and besides, the display module displays the data storing state; and Step 6, after the data storage is completed, storage completing information is fed back to the main control module, after receiving a signal, the main control module emits a data unloading signal to the data storing module and the data transmitting module every 2 min, the data in the data storing module is uploaded to a cloud server and other equipment needing aluminum oxide production indexes and variable data, in the uploading process, the data transmitting module performs package uploading on the data in the data storing module through 4G or wifi, and besides, the display module displays the data uploading state and the data uploading information.

Finally, it should be noted that the above embodiment is only used to illustrate without limiting the technical solution of the invention; although the invention has been described in detail with reference to the foregoing embodiment, it should be understood by those skilled in the art that these technical solutions described in the foregoing embodiment may be modified or some or all of its technical features equivalently may be substituted; and however, these modifications or substitutions do not cause the essence of the corresponding technical solution to depart from the scope defined by the claims of the invention.

What is claimed is:

1. A multi-scale data acquiring and processing device for an aluminum oxide production process, comprising:
    a data acquiring module,
    a data storing module,
    a main control module,
    a display module, a data processing module, and
    a data transmitting module,
    wherein the data acquiring module simultaneously acquires multi-scale data having different time scales in the aluminum oxide production process based on aluminum oxide production indexes and variables in a manner of cooperatively using a wired data acquiring port, a wireless data acquiring port and an image collector based on a camera, wherein the data acquiring is performed through cooperatively using a wired data acquiring manner and a wireless data acquiring manner for control equipment which can export the multi-scale data in the aluminum oxide production process, and the data acquiring is performed through an image acquiring machine for control equipment which cannot export the multi-scale data in the aluminum oxide production process;
    wherein the main control module connects with the data acquiring module, the data processing module, the data storing module, the display module and the data transmitting module, performs central regulation and control, and transmits a central control command to complete coordination and cooperation between the data acquiring module, the data processing module, the data storing module, the display module and the data transmitting module;
    wherein the data processing module performs timestamp alignment and abnormal value filtering treatment on the multi-scale data in the aluminum oxide production process acquired by the data acquiring module according to a data processing command from the main control module, applies a set of rules having different scales based on the aluminum oxide production process to perform data processing on the aluminum oxide production indexes and variables, and transmits the processed multi-scale data to the data storing module for data storage;
    wherein the data storing module simultaneously stores the multi-scale data from the data acquiring module and the data processing module according to a data storing command from the main control module at every fixed time and transmits the stored data to the data transmitting module;
    wherein the data transmitting module transmits the stored data stored by the data storing module to a system or a device according to a transmitting command from the main control module; and
    wherein the display module connects to the main control module through a touch screen for cooperative work.

2. The multi-scale data acquiring and processing device according to claim 1, wherein the aluminum oxide production indexes and variables comprise grinding AO, A/S, ore adjustment Nk, ore adjustment solid content, lime effective calcium, raw ore pulp solid content, raw ore pulp fineness, leaching red mud A/S, leaching red mud N/S, excretion A/S, leaching ak, leaching solid content, leaching rate, green liquor Nk, green liquor ak, green liquor seston, pregnant liquor seston, circulating spent liquor Nc/Nt, Nk, circulating efficiency, spent liquor seston, seed precipitation end tank ak, precipitation rate, flat plate filter cakes with water and soda, flat spent seston, precipitation spent liquor ak, and water content of red mud filter cakes.

3. The multi-scale data acquiring and processing device according to claim 1, wherein a detecting module with an indicator lamp is also built-in the data acquiring module, and when the data acquiring module performs the data acquiring, the indicator lamp of the detecting module continuously lights.

4. The multi-scale data acquiring and processing device according to claim 1, wherein the data processing module further comprises a data format converting sub-module which converts the processed data to data in a binary form to be transmitted to the data storing module for the data storage.

5. The multi-scale data acquiring and processing device according to claim 1, wherein the data storing module further comprises a format converting sub-module which converts the received data to data in the formats of .xls, .txt, .doc, .pdf or .csv for storage.

6. The multi-scale data acquiring and processing device according to claim 1, wherein the main control module and the data processing module both adopt a CPU, and the data storing module adopts a random access memory.

7. The multi-scale data acquiring and processing device according to claim 1, wherein the display module specifically comprises following functions:
    (1) examining working states of the data acquiring module, the data processing module, the data storing module and the data transmitting module; and
    (2) displaying data of all the aluminum oxide production indexes and variables in the data storing module.

8. A multi-scale data acquiring and processing method for the aluminum oxide production process, performing the data acquiring and processing by using the multi-scale data acquiring and processing device of claim 1, the method comprising following steps:
    step 1, the data acquiring module connects to a sensor to detect the aluminum oxide production indexes and variables in real time in an aluminum oxide process control system and a wireless collector to acquire data in a process operating system, a laboratory assaying and analyzing system through the wired data acquiring port and the wireless data acquiring port;

step 2, the aluminum oxide production indexes and variables are selected, and different sampling frequencies are set for different indexes and variables;

step 3, the main control module transmits a data acquiring command to the data acquiring module, the data acquiring module continuously responds the data acquiring command and completes the data acquiring, and the display module displays a data acquiring state;

step 4, the data acquiring module completes the data acquiring and transmits a data acquiring completing signal to the main control module, after the main control module receives the data acquiring completing signal, the main control module transmits the data processing command to the data processing module, the data processing module performs data scale discrimination after receiving the command, performs the data processing is based on different data applying rules having different scales, performs multi-scale data algorithm selection on the aluminum oxide production indexes and variables having different scales according to a conventional knowledge rule base, performs the timestamp alignment and the abnormal value filter treatment of the multi-scale data, and the display module displays a data processing state;

step 5, the data processing module feeds back a processing result to the main control module, the main control module transmits the data storing command to the data storing module after receiving a feedback, the data storing module receives data from the data processing module and performs the data storage, and the display module displays a data storing state; and step 6, after the data storage completes, feeds back storage completing information to the main control module, after receiving the storage completing information, the main control module transmits a data unloading signal to the data storing module and the data transmitting module every fixed time, and the multi-scale data in the data storing module to a cloud server and other equipment, the data transmitting module performs package uploading on the multi-scale data in the data storing module through 4G or wife, and the display module displays a data uploading state and data uploading information.

\* \* \* \* \*